(12) United States Patent
Krasle

(10) Patent No.: US 6,859,777 B2
(45) Date of Patent: *Feb. 22, 2005

(54) HYPERTEXT NAVIGATION SYSTEM CONTROLLED BY SPOKEN WORDS

(75) Inventor: Darin Edward Krasle, Atlanta, GA (US)

(73) Assignee: Siemens Aktiengesellschaft, Munich (DE)

( * ) Notice: Subject to any disclaimer, the term of this patent is extended or adjusted under 35 U.S.C. 154(b) by 39 days.

This patent is subject to a terminal disclaimer.

(21) Appl. No.: 09/764,792

(22) Filed: Jan. 17, 2001

(65) Prior Publication Data

US 2001/0002466 A1 May 31, 2001

Related U.S. Application Data

(63) Continuation of application No. 09/408,303, filed on Sep. 29, 1999, now abandoned, which is a continuation of application No. 08/557,525, filed on Nov. 17, 1995, now Pat. No. 6,029,135.

(30) Foreign Application Priority Data

Nov. 14, 1994 (DE) ......................... P44 40 598

(51) Int. Cl.[7] .............................................. G10L 15/22
(52) U.S. Cl. ..................... 704/270.1; 704/275; 704/240
(58) Field of Search .............................. 704/270, 270.1, 704/275, 272, 200, 235, 243, 239, 240, 249, 254, 260, 231, 246, 251, 257, 252, 276, 256

(56) References Cited

U.S. PATENT DOCUMENTS 5,513,298 A * 4/1996 Stanford et al. ........... 395/2.84
5,519,809 A * 5/1996 Husseiny et al. .......... 395/2.84
5,557,539 A * 9/1996 Fitch .......................... 364/514
5,689,620 A   11/1997 Kopec et al.
5,754,939 A    5/1998 Herz et al.
5,774,859 A    6/1998 Houser et al.
5,884,266 A * 3/1999 Dvorack ..................... 704/275

FOREIGN PATENT DOCUMENTS

EP           0 607 614 A1 * 7/1994 ............. G06F/3/16

OTHER PUBLICATIONS

The Johns Hopkins University Press. George P. Landow, "The Definition of Hypertext and Its History as a Concept" 1992.*
ACM SIGAPL APL Quote Quad, Proceedings of the international conference on APL Sep. 1993. Smith et al., "JVOX" vol. 4 Issue 1. pp. 251–258.*
Conference proceedings on Human factors in computing systems May 1993. Apperley et al., "Human–computer interaction research at Massey University, New Zealand". pp. 224–245.*
ACM SIGPLAN Notices, Conference proceedings on Object–oriented programming systems, languages and applications Sep. 1989. Fenton et al., Playground: an object–oriented simulation system with agent rules for children for all ages. pp. 123–137.*

(List continued on next page.)

Primary Examiner—Richemond Dorvil
(74) Attorney, Agent, or Firm—Staas & Halsey LLP

(57) ABSTRACT

A hypertext navigation system that is controllable by spoken words has hypertext documents to which specific dictionaries and probability models for assisting in an acoustic voice recognition of hyper-links of this hypertext document are allocated. Control of a hypertext viewer or, respectively, browser and navigation in the hypertext document or hypertext system by pronouncing links is provided. The voice recognition is thereby optimally adapted to the links to be recognized without these having to be previously known.

23 Claims, 1 Drawing Sheet

OTHER PUBLICATIONS

ACM SIGPLAN Bulletin, Proceedings of the SIGCHI conference on Wings for the mind Mar.1989. Halstead–Nussloch, "The design of phone–based interfaces for consumers". pp 123–137.*

IEEE Multimedia. Hemphill et al., "Speech Aware Multimedia". pp. 74–78. Spring 1996.*

ACM Multimedia 95. Hemphill et al., "Surfing the web by voice". Nov. 1995.*

Microsoft press, "Computer Dictionary". p. 203, 1993.

J. Conklin, "Hypertext: An Introduction and Survey", IEEE Computer, Sep. 1987, pp. 17–41.

M. Muller et al., "Toward a Definition of Voice Documents", Proceedings of COIS, 1990, pp. 174–183.

B. Arons, "Authoring and Transcription Tools for Speech–Based Hypermedia Systems", Proceedings of 1991 Conference American Voice I/O Society, Sep. 1991, pp. 15–20.

The Johns Hopkins University Press. Landow, The definition of hypertext and its hitory as a concept, 1992.

Rudnicky, "Speech Wear: A mobile speech system", 1993.

* cited by examiner

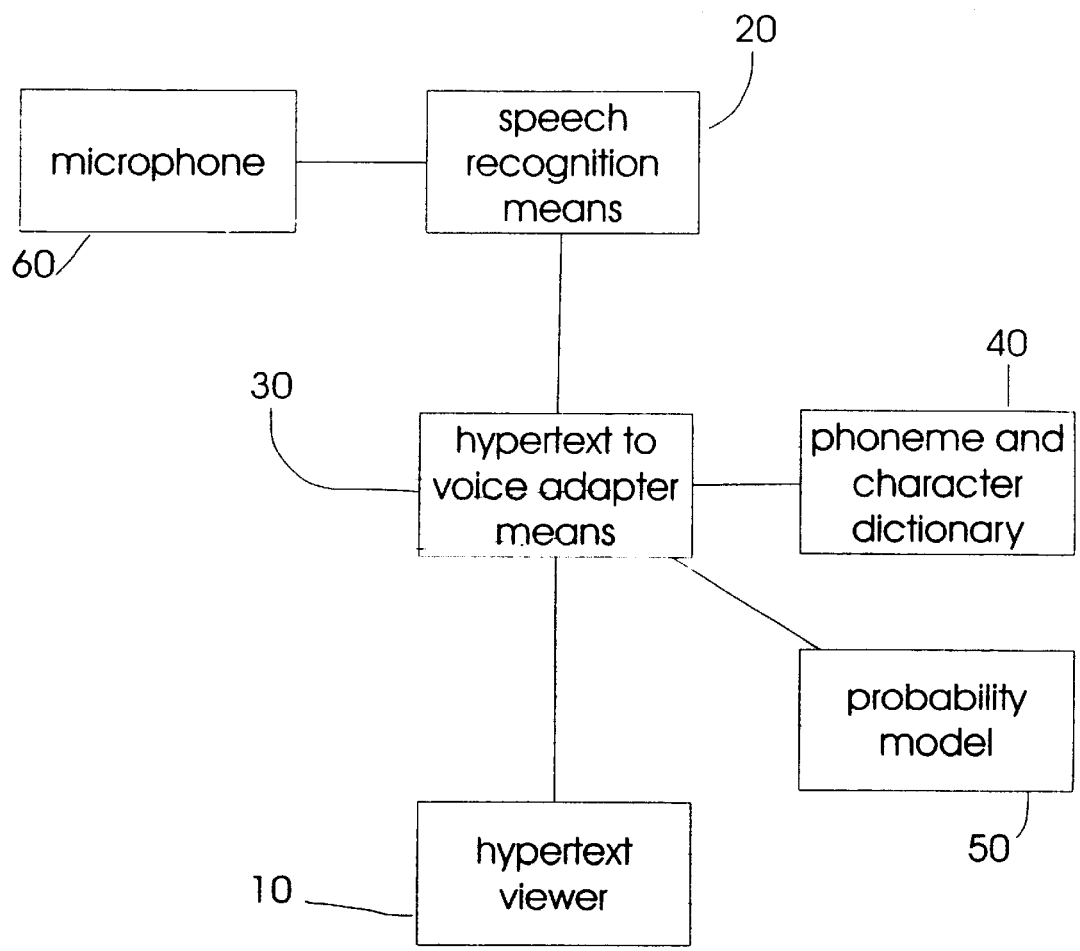

HYPERTEXT NAVIGATION SYSTEM CONTROLLED BY SPOKEN WORDS

CROSS-REFERENCE TO RELATED APPLICATIONS

The present application is a Continuation of U.S. application Ser. No. 09/408,303, filed Sep. 29, 1999 now abandoned, which is a Continuation of U.S. application Ser. No. 08/557,525, filed Nov. 17, 1995, now issued as U.S. Pat. No. 6,029,135.

BACKGROUND OF THE INVENTION

1. Field of the Invention

The present invention relates generally to a voice-activated navigation means and method for hypertext documents.

2. Description of the Related Art

Hypertext systems are rapidly gaining increasing significance in many areas of data and communications technology. The important examples that have already been realized are:

Typical hypertext help systems and hypertext documentation for software applications (for example, under graphics operating systems for personal computers), wherein the user can usually navigate within single hypertext documents that are stored as data files on a single computer, as well as the World Wide Web (WWW), a worldwide hypertext network based on the Internet that makes it possible for the user to navigate through a plurality of hypertext documents linked to one another that cite one another (i.e., reference one another) and that are generally stored on a great number of computers in the network at a great distance from one another. Hypertext documents thereby generally contain information in the form of text, digital images or audio or video data or combinations thereof.

A significant, characteristic feature of all hypertext systems is the possibility of navigation. In addition to containing the actual text of the document, a hypertext document contains special character sequences that can also be a component part of the actual text and that are usually referred to as links or hyper-links and that serve the purpose of hypertext navigation. Normally, these character sequences are specially marked, for example by being displayed in a different color or are emphasized in some other way, to distinguish the special character sequences from the ordinary text of the document. When a user of a hypertext system selects such a link, usually with a short click with the mouse or other pointing device, the hypertext system reacts to this instruction in that it displays the part of the same hypertext document associate with this character sequence (or link) or the system displays a different hypertext document. Other possible reactions to the selection of the link are opening up a connection to a different computer, for example to an on line data bank, starting another application program, opening another data file, initiating a data processing process or a combination of such possible reactions.

In addition thereto, hypertext systems usually also execute other instructions that are not associated with the character sequences (links) in the hypertext documents such as, for example, paging through documents that are already displayed or through document parts (for example, pages of the document), storing hypertext pages in what are referred to as hot lists, retrieving or paging through pages stored in hot lists, reloading images, etc. These instructions are normally input in the way typical for graphic user interfaces, for example with the mouse or other pointed device.

There are a number of possible applications of hypertext-based systems wherein the traditional way of inputting instructions or of activating links is considered to be disturbing, undesirable or even impossible. This, for example, is the case when the user is impeded, his hands are busy with managing other jobs or when the ambient conditions forbid the employment of traditional input devices. Voice recognition is available here as a simple, natural type of input that assumes less expertise on the part of the user than other input means.

The integration of traditional, acoustic voice recognition systems, i.e. systems for recognizing spoken language, with hypertext systems, which are also known as "viewer" or "browser" systems, are opposed by technological difficulties. The voice recognition system, namely, must be in the position to recognize every word that can occur as a link in a hypertext document. Because practically every word in the text can also be a hyper-link, extremely large dictionaries would be required for this purpose, and these large dictionaries would reduce the processing speed and the recognition performance of this system to an unjustifiable extent. Even if the employment of 2 extremely large dictionaries were possible, the numerous coining of new words and proper names could not be recognized, these new words being so typical of many hypertext applications, specifically, however, for hypertext networks such as the World Wide Web. Probably for this reason, a hypertext navigation system to be controlled by voice recognition has not yet been disclosed.

SUMMARY OF THE INVENTION

An object of the present invention is therefore to provide a hypertext navigation system that is controllable by spoken words. This and other objects and advantages are inventively achieved by a hypertext navigation system that is controllable by spoken words which includes a means for recognizing spoken language and means for adapting this voice recognition means to the contents of hypertext documents. By adapting the voice recognition means to the contents of the hypertext documents, large dictionaries can be dispensed with and the recognizability of arbitrary, even unpredicted, words in hypertext documents is fundamentally assured.

The hypertext documents which are used with a system for recognizing spoken language include hypertext character sequences for hypertext navigation in the hypertext document and further data in the hypertext document, the further data assisting the system for recognizing spoken language in the recognition of spoken words that correspond to the hypertext character sequences of the hypertext document. The hypertext character sequences are links which provide for hypertext navigation. The further data are composed of a dictionary and of a probability model, whereby the dictionary contains the character sequences, or links, of the hypertext document that serve the purpose of hypertext navigation and phoneme sequences allocated thereto as entries, and whereby the probability model makes it possible for a system for the recognition of spoken language to allocate a spoken word or a sequence of spoken words to an entry of the dictionary.

These inventive hypertext documents can be generated from traditional hypertext documents by a method for generating a hypertext document from a traditional hypertext document, including the following steps: a) the source text of the traditional hypertext document is investigated for character sequences that serve the purpose of hypertext navigation, these character sequences are extracted from the source text; b) phoneme sequences are allocated to these character sequences; character sequences and appertaining phoneme sequences are entered into a dictionary; and c) a probability model for an acoustic voice recognition system is produced for the entries of the dictionary. Preferably, instructions of the hypertext navigation system together with phoneme sequences corresponding to them are entered into a dictionary in addition to the character sequences that serve the purpose of hypertext navigation.

Advantageous developments of the invention are provided by a hypertext navigation system controllable by spoken words including: a) a means for the recognition of spoken language that can allocate a spoken word or a sequence of spoken words to entries of a dictionary or of a plurality of dictionaries; b) at least one first dictionary containing character sequences of a hypertext document serving the purpose of hypertext navigation and containing phoneme sequences allocated thereto as entries; c) at least one second dictionary that can also be identical to the first dictionary or a part thereof which contains instructions of the hypertext navigation system as entries.

The dictionary and the probability model allocated to a hypertext document or to a part of a hypertext document are produced at run time and the voice recognition system is reconfigured at run time, in a preferred embodiment.

The hypertext navigation system of the present invention can also be controlled in a traditional way.

The hypertext navigation system, based on the definition of the user, dictionaries and probability models that have been produced for hypertext documents or parts thereof already displayed or partially displayed can be stored so that these can be accessed in case of a renewed display of these hypertext documents or parts thereof.

DETAILED DESCRIPTION OF THE PREFERRED EMBODIMENTS

The invention is described in greater detail below with reference to preferred exemplary embodiments.

An example of a hypertext-based, world-wide network is what is referred to as the World Wide Web based on the Internet. A number of software products called "viewers" or "web-browsers" 10 exist for this network; the web-browsers enable the loading and viewing of hypertext documents in the World Wide Web and assist in navigation through this system. Hypertext documents are generally documents with text, image, audio and/or video parts that differ from traditional text or multimedia documents particularly due to the presence of what are referred to as "hyper-links" (often also simply referred to as "links") and the possibility of navigation connected to these links that is typical of hypertext documents.

Links are normally character sequences that can also be a component part of the actual text; fundamentally, the functionalities of finks can also be allocated to other objects such as, for example, images or "buttons" in a hypertext document. Normally, these character sequences which are employed as links are specially marked, for example, by being displayed in a different color or are emphasized in some other way. When a user of a hypertext system selects such a link, usually with a short click with the mouse or other pointing device, the hypertext system reacts to the selection by carrying out an instruction in that it displays a part of the same hypertext document or a different hypertext document associated with this character sequence, or link. Other possible reactions associated with the selection of the instruction are opening a connection to another computer, for example to an on line data bank, starting a further application program, opening another data file, initiating a data processing process or a combination composed of such possible reactions.

In addition thereto, hypertext systems usually execute other instructions that are not associated to links in hypertext documents, such as, for example, paging through documents or document parts that are already displayed (for example, pages), storing hypertext pages in what are referred to as hot lists, retrieving or paging through pages stored in hot lists, reloading images, etc. These instructions are normally input in the way as is typical for graphic user interfaces, for example with the mouse or other pointing device.

Hypertext documents can be organized and structured in many ways. In addition to the actual hypertext structure, hierarchic structures or list structures also come into consideration. Other hypertext documents are in communication with the data banks, or data bases, for example, and so serve the as input and/or output forms for the data bases. These structures can be also superimposed within a hypertext document. A single hypertext document can thereby contain only a few or, on the other hand, several thousand finks. Documents in the World Wide Web are representative examples of the variety of possible hypertext documents.

There are a number of application possibilities of hypertext-based systems wherein the traditional type of input of instructions or activation of links using a pointing device is considered disturbing, undesirable or even impossible. This is the case, for example, when the user is impaired or handicapped, the user's hands are busy with managing other jobs or when the ambient conditions forbid the employment of traditional input devices. Voice recognition 20 is available here as a simple, natural type of input that assumes less expertise on the part of the user than do other input means.

The integration of traditional, acoustic voice recognition systems 20, i.e. systems for recognizing spoken language, with hypertext systems, which are also known as "viewer" or "browser" systems, are opposed by technological difficulties. The voice recognition system, namely, must be in the position to recognize every word that can occur as a link in a hypertext document. Because practically every word in the text can also be a hyper-link, extremely large dictionaries would be required for this purpose, and these would reduce the processing speed and the recognition performance of this system to an unjustifiable extent. Even if the employment of extremely large dictionaries were possible, the numerous coining of new words and proper names could not be recognized, these being so typical of many hypertext applications, specifically, however, for hypertext networks such as the World Wide Web. Probably for this reason, a hypertext navigation system to be controlled by voice recognition has not yet been disclosed.

According to the present invention, the problems are solved by means 30 for adapting a voice recognition means 20 to the contents of hypertext documents. These means are preferably composed of further data that are allocated to a hypertext document and that assist a system for the recognition of spoken language in the recognition of spoken words that correspond to character sequences, i.e. to the hyper-links, of this hypertext document that serve the purpose of hypertext navigation.

According to a preferred embodiment of the present invention, these further data are composed of a dictionary 40 and of a probability model 50 whereby the dictionary contains character sequences that serve the purpose of hypertext navigation, i.e. the links of this hypertext document, and phoneme sequences that are allocated to the character sequences as entries in the dictionary, whereby the probability model makes it possible for a system for recognizing spoken language to allocate a spoken word or a sequence of spoken words to an entry of the dictionary. This is accomplished by detecting the words spoken by the user via a microphone 60 as in the known voice recognition systems. The phoneme sequences in the dictionary are compared to the spoken word and a phoneme sequence with the highest probability of matching the spoken words according to the probability model is selected. The corresponding character sequences are then executed.

According to a preferred embodiment of the invention, these further data for a hypertext document or for a part thereof can be generated when a user opens or requests the document or a part thereof. This embodiment of the invention, wherein the data for adapting the voice recognition system are thus only generated at the run time of the viewer and are only generated in the system of the user, shall be referred to below as the run time version of the invention. A part of a document in the sense of this specification can thereby be, for example, a page of a hypertext document or a sequence of closely related pages of a larger document. It is fundamentally true that hypertext documents or pages are often not completely transmitted to the user immediately but that specific document parts, for example, images, audio or video sequences are communicated to the user only in response to a separate request of the user due to the great quantity of data in such images, audio or video portions. What is important is that the further data in the sense of this invention given the run time version are initially generated in the user system, namely only when and only to the scope as is in fact or is presumed to be required by the user, so that navigation is enabled by loudly pronouncing the links that are contained in the appertaining part of the hypertext document. In other words, the further data including the dictionary and the probability model are generated in the user's computer when each page, for example, is accessed. When another portion of the hypertext document is accessed by the user, the present invention generates the data necessary for voice control of the hypertext portions corresponding to that portion. The data for each portion is, thus, sequentially generated.

In another embodiment of the invention, the off line version, the further data for a hypertext document are already generated by the producer or vendor of this document (off line, not at the run time), and this further data is offered, at any rate, for loading or for transmission together with the actual hypertext document. In other words, the further data for voice control of that portion of the document is transmitted to the user with the corresponding document portion.

For generating the further data, i.e. the dictionary or, respectively, dictionaries and the probability model, the links in both versions according to the present invention are sought in the appertaining hypertext document and are extracted from the source text of the hypertext document. Each character sequence corresponding to a link has a phoneme sequence corresponding to a pronunciation or a plurality of phoneme sequences, for example, corresponding to alternative pronunciation possibilities, allocated to it. Character sequences and phoneme sequences are entered into a list that forms a dictionary in the sense of this invention. In the run time version of the invention, the phoneme sequences are generated in the user system, preferably with the assistance of universally valid pronunciation rules that are specific to a particular language. This can be advantageous in the case of less familiar words since the actual pronunciation of these words can, thus, be approximated better by a plurality of users than given employment of the (correct) phoneme sequences of a dictionary.

In any case, the "run time version" is a great advantage when the number of links is extremely great because substantially more data than in traditional hypertext documents would otherwise have to be transmitted. Errors in the recognition of spoken links will occasionally occur in this method but the errors do not involve great disadvantages since a navigation error can always be canceled by a simple, additional command, for example, by an "undo" command. The "undo" command may be spoken as well. Further, the run time version has the advantage that the producer or vendor of a document need not know the pronunciation rules of a user. The run time version can, therefore, also be employed when identical character sequences could be pronounced differently by different users, as long as the user systems employ the "correct" pronunciation rules for the respective user. In other words, each user may program his system to the pronunciation rules used by that user. A further advantage of the run time version is that the instructions and appertaining phoneme sequences of the user or of a plurality of users need not be known when the dictionary is produced. As a result, the employment of different software products having divergent command sets is also possible.

The off line version yields advantages mainly when no phoneme sequences of adequately good quality can be generated with the assistance of universally valid pronunciation models. This will mainly be the case in application fields wherein a high priority is accorded in order to reduce recognition errors. On the basis of the present comments, a person skilled in the art can immediately recognize that mixed forms of the two described embodiments can also be advantageous wherein some of the further data of a hypertext document are generated off line, i.e. by the producer or vendor of a document, and that other parts are generated "at run time", i.e. by the user. For instance, phoneme sequences to especially critical links may already be contributed to a document by the author, by contrast whereto, for example, the phoneme sequences of the system instructions of a "web-browser" are kept on hand in a data file on the user system.

The extraction of the links from a hypertext document is, for example, be performed by software written for this purpose, which are referred to here as "managers", that contains the source text of a document of the "viewer". The source text, for example, is be written in the hypertext Markup Language HTML, as is standard in the World Wide Web. The manager processes the source text in the fashion of a parser and extracts the links. Textural HTML links are usually composed of at least two parts: of a character sequence that the viewer normally shows the user and of a uniform resource locator (URL) that normally has the syntactic form http://host.domain/path/file in the WWW. "Host" thereby designates a host computer in a network domain referenced designated as "domain". Hopefully, there is a data file, which is usually a HTML document, designated as "file" on this computer under the path "path", in particular, the file is the HTML document which the link references with this URL. Examples for URLs are, for example, http://www.sni.de/pub/docs/mydoc.html, with which a HTML file named "mydoc.html" in the subdirectory "/docs" of the directory "/pub" on the German WWW server "www.sni.de" is referenced, or http://sunsite. unc.edu/patents/intropat. html, a reference to the home page "intropat.html" of a non-commercial data bank for U.S. patents at the University of North Carolina (UNC). The URL thus contains the actual information about the storage location of the document or document part which the link references with the character sequence shown by the viewer.

The manager now generates at least one phoneme sequence for each character sequence of each and every link, this at least one phoneme sequence characterizing the surmised pronunciation or pronunciations of the character sequence and enters the character sequences together with the phoneme sequences in a dictionary. The dictionary is thus an allocation between character sequences and phoneme sequences. Subsequently, a statistical analysis of the words in the dictionary is implemented and a probability model is generated that defines the probability of word combinations in the dictionary. The dictionary and the probability model are employed for a configuration and, thus, for the adaptation of a voice recognition system that is intended to allocate character sequences of the dictionary and, thus, links of the hypertext document to words spoken by the user. The voice recognition system is thus specifically adapted to the recognition of the links contained in the hypertext document, as a result, recognition capability with respect to the links is dramatically improved. Recognized character sequences are converted into hypertext navigation instructions. When a link was recognized, the URL associated with this link is activated or a different reaction of the system allocated to this link is initiated. When a system command was recognized; this is forwarded to the viewer and implemented by it. The extraction process begins anew after the loading of a HTML file that corresponds to a URL.

Having read this disclosure, it is clear that it is usually advantageous to keep the dictionaries and probability models of the last (i.e. most recently accessed) pages or to keep document portions of especially important documents on hand on the user system in case these pages are loaded anew (in other words, provide a cache memory for the further data). Many viewers keep the HTML source texts of the last viewed HTML pages stored or allow the user to store these texts or their URLs, for example in hot lists, in order to be able to retrieve or relocate these pages later more quickly. Similar methods are available for the further data in the sense of the present invention, i.e. the dictionaries and probability models, so that these need not be regenerated in every instance.

It is often advantageous that the navigation using hyperlinks is also possible in a traditional way. The traditional operation of the hypertext navigation system, for example with the mouse or other pointing device, is therefore possible in addition to the voice control in many instances.

In addition to being employed for navigation, the voice control, of course, can also be employed for controlling other elements of a hypertext system, for instance to control the downloading of images, calling programs, activation of "buttons", etc. The only prerequisite therefor is that pronounceable character sequences that are accessible to the user and that can be incorporated in dictionaries are allocated to these control elements.

Thus, there is described a hypertext navigation system for voice controlled navigation wherein a dictionary is provided which includes probability models for the spoken words. The dictionary and probability model, which includes phoneme sequences to be matched to the spoken words, is generated in the users system during access to the hypertext document in the run time version of the invention. An offline version provides a dictionary and probability model that is generated by the author, for example, of the hypertext document, is stored on the server and is forwarded to the user system when the document is accessed by the user. The dictionary and probability model correspond to the hypertext elements that are in the hypertext document which is being accessed by the user. Accordingly, the dictionary and probability model are discarded and a next dictionary and probability model obtained as the next hypertext document is accessed. As mentioned, storage of recent or important dictionaries and probability models are also provided.

Although other modifications and changes may be suggested by those skilled in the art, it is the intention of the inventor to embody within the patent warranted hereon all changes and modifications as reasonably and properly come within the scope of his contribution to the art.

What is claimed is:

1. A hypertext navigation system controllable by spoken words, comprising:
    a means for recognizing spoken language; and
    means for adapting said means for recognizing spoken language to contents of hypertext documents.

2. A hypertext navigation system according to claim 1, wherein said hypertext navigation system is used to navigate the World Wide Web.

3. A hypertext navigation system according to claim 2, wherein said hypertext documents are files using HTML.

4. A hypertext navigation system according to claim 1, wherein said hypertext navigation system is used to navigate help files on a computer.

5. A hypertext navigation system according to claim 1, wherein said hypertext documents are further linked to other hypertext documents through hypertext character sequences.

6. A hypertext document for use with a system for recognizing spoken language, comprising:
    hypertext character sequences for hypertext navigation in said hypertext document; and
    further data associated with said hypertext document, said further data comprising entries allocated to character sequences of said hypertext document, said further data assisting said system for recognizing spoken language in recognition of spoken words that correspond to said hypertext character sequences of said hypertext document.

7. A hypertext document according to claim 6, wherein said further data include a dictionary and a probability model, said dictionary containing said hypertext character sequences of said hypertext document and phoneme sequences allocated to said hypertext character sequences as entries, and wherein said probability model includes probabilities for matching said phoneme sequences to spoken words to make it possible for said system for recognizing spoken language to allocate a spoken word or a sequence of spoken words to an entry of said dictionary.

8. A hypertext document according to claim 6, wherein said hypertext document is a file using HTML.

9. A hypertext navigation system controllable by spoken words, comprising:
    means for recognizing spoken language; and
    means for adapting said means for recognizing to contents of hypertext documents, comprising:
        hypertext character sequences for hypertext navigation in said hypertext document; and
        further data allocated to said hypertext document, said further data assisting said system for recognizing spoken language in recognition of spoken words that correspond to said hypertext character sequences of said hypertext document.

10. A hypertext navigation system controllable by spoken words, comprising:
    means for recognizing spoken language; and means for adapting said means for recognizing to contents of hypertext documents, comprising:
hypertext character sequences for hypertext navigation in said hypertext document; and
further data allocated to said hypertext document, said further data assisting said system for recognizing spoken language in recognition of spoken words that correspond to said hypertext character sequences of said hypertext document, wherein said further data include a dictionary and a probability model, said dictionary containing said hypertext character sequences of said hypertext document and phoneme sequences allocated to said hypertext character sequences as entries in said dictionary, and wherein said probability model makes it possible for said system for recognizing spoken language to allocate a spoken word or a sequence of spoken words to an entry of said dictionary.

11. A hypertext navigation system controllable by spoken words as claimed in claim 10, whereby said dictionary and said probability model allocated to a hypertext document or to a part of a hypertext document are produced at run time and the voice recognition system is reconfigured at run time.

12. A hypertext navigation system controllable by spoken words as claimed in claim 10, whereby, based on definition of a user, said dictionaries and said probability models that have been produced for at least portions of hypertext documents which have been already at least partially displayed are stored so that said dictionaries and said probability models are accessed in case of a renewed display of said at least portions of hypertext documents.

13. A hypertext navigation system controllable by spoken words, comprising:
a) means for recognizing spoken language to allocate a spoken word or a sequence of spoken words to entries of a dictionary or of a plurality of dictionaries;
b) at least one first dictionary containing character sequences of a hypertext document serving a purpose of hypertext navigation and containing phoneme sequences allocated to said character sequences as entries; and
c) at least one second dictionary that contains instructions of the hypertext navigation system as entries.

14. A hypertext navigation system controllable by spoken words, comprising:
a) means for recognizing spoken language to allocate a spoken word or a sequence of spoken words to entries of a dictionary or of a plurality of dictionaries;
b) at least one dictionary containing character sequences of a hypertext document serving a purpose of hypertext navigation and containing phoneme sequences allocated to said character sequences as entries, at least a portion of said at least one dictionary containing instructions of the hypertext navigation system as entries.

15. A hypertext navigation system controllable by spoken words as claimed in claim 14, wherein said hypertext navigation system is selectively controllable in a traditional way by selection of character sequences using a pointing device.

16. A method for generating a hypertext document having a dictionary and a probability model, said dictionary containing said hypertext character sequences of said hypertext document and phoneme sequences allocated to said hypertext character sequences as entries, and wherein said probability model makes it possible for said system for said system for recognizing spoken language to allocate a spoken word or a sequence of spoken words to an entry of said dictionary from a traditional hypertext document, comprising the steps of:
investigating a source text of a traditional hypertext document for character sequences that serve a purpose of hypertext navigation, extracting said character sequences from said source text;
allocating phoneme sequences to said character sequences;
entering said character sequences and appertaining phoneme sequences into a dictionary; and
producing a probability model for an acoustic voice recognition system for entries of said dictionary.

17. A method as claimed in claim 16, further comprising the step of:
entering instructions of the hypertext navigation system together with phoneme sequences corresponding to said instructions into said dictionary in addition to said character sequences that serve the purpose of hypertext navigation.

18. A hypertext document for use with a system for recognizing spoken language, comprising:
hypertext character sequences for hypertext navigation in said hypertext document, said hypertext character sequences being potentially unknown words to said system for recognizing spoken language; and
further data allocated to said hypertext document, said further data including spoken language elements corresponding to said hypertext character sequences for assisting said system for recognizing spoken language in recognition of spoken words that correspond to said hypertext character sequences of said hypertext document and in activation of corresponding hypertext navigation functions.

19. A hypertext navigation system controllable by spoken words, comprising:
means for recognizing spoken language; and
means for adapting said means for recognizing to potentially unknown words of hypertext documents, comprising:
hypertext character sequences being the potentially unknown words for hypertext navigation in said hypertext document; and
further data allocated to said hypertext document including a set of acceptable spoken words corresponding to said hypertext character sequences, said further data assisting said system for recognizing spoken language in recognition of spoken words of a user that correspond to said hypertext character sequences of said hypertext document and in activating hypertext navigation functions corresponding to said hypertext character sequences.

20. A hypertext navigation system controllable by spoken words, comprising:
means for recognizing spoken language; and
means for adapting said means for recognizing to potentially unknown words of hypertext documents, comprising:
hypertext character sequences being the potentially unknown words for hypertext navigation in said hypertext document; and
further data allocated to said hypertext document, said further data assisting said system for recognizing spoken language in recognition of spoken words that correspond to said hypertext character sequences of said hypertext document, wherein said further data include a dictionary and a probability model, said dictionary containing said hypertext character sequences identified from said hypertext document and phoneme sequences allocated to said hypertext character sequences as entries in said dictionary, and wherein said probability model makes it possible for said system for recognizing spoken language of a user to allocate a spoken word or a sequence of spoken words to an entry of said dictionary and activate a function corresponding to said hypertext character sequence.

21. A hypertext navigation system to navigate a hypertext document, comprising:

- a voice recognition device to recognize a voice input, associate the voice input with a vocabulary entry and supply an output command;
- a navigation system to receive the output command from the voice recognition device and navigate access from a first hypertext document portion to a second hypertext document portion; and
- an adaptable dictionary storing vocabulary entries which change based on character sequences contained in the hypertext document portion, which is currently being accessed by the navigation system.

22. A hypertext navigation system to navigate at least a portion of the World Wide Web, comprising:

- a voice recognition device to recognize a voice input, associate the voice input with a vocabulary entry and supply an output command;
- a navigation system to receive the output command from the voice recognition device and navigate access on the World Wide Web from a first hypertext document portion to a second hypertext document portion; and
- an adaptable dictionary storing vocabulary entries which change based on the content of the hypertext document portion, which is currently being accessed by the navigation system.

23. A hypertext navigation system according to claim 22, wherein

- the navigation system navigates access from a first hypertext document to a second hypertext document; and
- the adaptable dictionary changes vocabulary entries based on the content of the hypertext document, which is currently being accessed by the navigation system.

\* \* \* \* \*

UNITED STATES PATENT AND TRADEMARK OFFICE
CERTIFICATE OF CORRECTION

PATENT NO. : 6,859,777 B2
DATED : February 22, 2005
INVENTOR(S) : Darin Edward Krasle It is certified that error appears in the above-identified patent and that said Letters Patent is hereby corrected as shown below:

Title page,
Item [56], References Cited, OTHER PUBLICATIONS,
"ACM SIGPLAN Notices" reference, replace "rules for children for" with -- rules for children of --.

Signed and Sealed this

Seventeenth Day of January, 2006

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 6,859,777 B2 | Page 1 of 1 |
| APPLICATION NO. | : 09/764792 | |
| DATED | : February 22, 2005 | |
| INVENTOR(S) | : Darin Edward Krasle | |

It is certified that error appears in the above-identified patent and that said Letters Patent is hereby corrected as shown below:

Title page, Item (63), replace "Nov. 17, 1995" with --Nov. 14, 1995--.

Signed and Sealed this

Third Day of October, 2006

JON W. DUDAS
*Director of the United States Patent and Trademark Office*